(12) United States Patent
Coleman

(10) Patent No.: US 7,202,406 B2
(45) Date of Patent: Apr. 10, 2007

(54) SYSTEM AND METHOD FOR TEACHING DRUMMERS

(76) Inventor: Ronald E Coleman, 18673 152nd St., Basehor, KS (US) 66007

(*) Notice: Subject to any disclaimer, the term of this patent is extended or adjusted under 35 U.S.C. 154(b) by 1007 days.

(21) Appl. No.: 10/361,253

(22) Filed: Feb. 10, 2003

(65) Prior Publication Data
US 2004/0154458 A1 Aug. 12, 2004

(51) Int. Cl.
*F16B 27/00* (2006.01)
(52) U.S. Cl. .................................... 84/470 R
(58) Field of Classification Search ......... 84/470 R, 84/411 R, 477 R, 483.1, 483.2, 484, 471 R
See application file for complete search history.

(56) References Cited

U.S. PATENT DOCUMENTS

| | | | |
|---|---|---|---|
| 3,700,785 A | 10/1972 | Leonard | |
| 3,921,493 A | 11/1975 | Leonard | |
| 4,261,241 A | 4/1981 | Gould | |
| 5,309,812 A | 5/1994 | Shelton | |
| 6,057,501 A | 5/2000 | Hale | |
| 6,063,992 A * | 5/2000 | Schwagerl | 84/411 P |
| 6,124,540 A | 9/2000 | Lotito | |
| 6,127,616 A | 10/2000 | Yu | |
| 6,288,315 B1 | 9/2001 | Bennett | |
| 6,407,323 B1 | 6/2002 | Karapetian | |
| 6,459,029 B2 | 10/2002 | Uehara | |
| 2002/0050206 A1 * | 5/2002 | MacCutcheon | 84/477 R |
| 2005/0045024 A1 * | 3/2005 | Sagastegui | 84/470 R |
| 2006/0065099 A1 * | 3/2006 | Anderson | 84/411 M |

FOREIGN PATENT DOCUMENTS

| | | |
|---|---|---|
| FR | 2 661 838 | 8/1990 |
| WO | WO 93/25995 | 12/1993 |

* cited by examiner

*Primary Examiner*—Gary F. Paumen
(74) *Attorney, Agent, or Firm*—David F. Herron, II

(57) ABSTRACT

The invention is a system and method for teaching how to play multi-component percussion equipment. The inventive method includes the steps of attaching respective indicators, each bearing a distinct color, to each respective component of the percussion equipment, and coloring notes on the drummer's score with respective matching colors, and the step of playing notes on the drummer's score on the corresponding respective piece of equipment. The inventive system includes a musical score, a first drum stick, a second drum stick, and a plurality of respective indicators, each indicator having distinct color, attached to each respective component of the equipment. The score is color-coded such that notes that are to be played on a respective component are indicated in a respective color.

22 Claims, 6 Drawing Sheets

SYSTEM AND METHOD FOR TEACHING DRUMMERS

SUMMARY OF THE INVENTION

The invention includes both a system for teaching a student how to play multi-component percussion equipment, and a method for teaching a student how to play the same. The system and method are closely related, they will be discussed separately hereunder.

THE METHOD

The inventive method teaches a student how to play a drummer's score on a multi-component percussion equipment. The inventive method can be used with the tri-set, quad-set, or quint set of tom-toms, which are commonly used by marching drummers, or it may also be used with a standard drum set.

Generally stated, the inventive method is well-suited to be used for teaching a student how to play a drummer's score on any multi-component percussion equipment, and includes the steps of attaching respective indicators, each bearing a distinct color, to each respective component of the percussion equipment. Further, the method will include the coloring of notes on the drummer's score with respective matching colors, and also playing notes on the drummer's score in a respective color on the respective component bearing the matching color.

Specifically, the method has application with tri, quad and quint tom-toms, as well as application with traditional drum sets. Each specific application of the method is discussed separately hereunder.

The Method with Multi-Component Percussion Equipment, such as Quad Tom-Toms

When used with multi-component equipment, the inventive method includes the steps of attaching an indicator of a first color to the first percussion instrument and attaching an indicator of a second color to the second percussion instrument. In like manner, an indicator of a third color is affixed to the third percussion instrument, and so forth, if applicable.

Additionally, the method includes the steps of coloring notes on the score that are to be played on the first percussion instrument with the first color, coloring notes on the score that are to be played on the second percussion instrument with the second color, and coloring notes on the score that are to be played on third percussion instrument with the third color.

Optionally, the method may include the step of adding a fourth percussion instrument and positioning the fourth percussion instrument adjacent at least one of the others. In like manner, one may attach an indicator of a fourth color to the fourth percussion instrument, and color code notes on the score that are to be played on the fourth percussion instrument with the fourth color.

In a preferred embodiment of the method, each of the percussion instruments is a drum. However, other combinations of instruments are possible. For example, one may use a cymbal, chime, cow bell, or the like.

The method may also include the step of assigning a first drum stick to the student's right hand and a second drum stick to the student's left hand. Accordingly, one may impose a first figure on each note in the score to be played with the student's right hand. In like manner, one may also impose a second figure on each note in the score to be played with the student's left hand.

Thus, the method may further include the steps of coloring the sticks in accord with the figures. Specifically, the method may include the steps of coloring the first drumstick white and the second drumstick black, and shading the corresponding first figure white and the second figure black.

Method with Drum Set

Generally, the drum set will include a bass drum, a snare drum, a tom-tom, a high hat cymbal, a crash cymbal, and a ride cymbal. Of course, the drum set may also include additional components.

When used in connection with a drum set, the method will include the steps of assigning a first color to the snare drum, assigning a second color to the bass drum, assigning a third color to the tom tom, assigning a fourth color to the high hat cymbal, assigning a fifth color to the crash cymbal, and assigning an sixth color to the ride cymbal.

The method will also include the steps of coloring notes on the drummer score in a corresponding fashion. Specifically, notes to be played on the snare drum are colored with the first color, notes to be played on the bass drum are colored with the second color, notes on the score that are to be played on the tom-tom are colored with the third color, notes to be played on the high hat cymbal are colored with the fourth color, notes to be played on the crash cymbal are colored with the fifth color, and notes to be played on the ride cymbal are colored with the sixth color.

Optionally, one may assign a first drum stick to the drummer's right hand and a second drum stick to the student's left hand, and impose respective first and second figures on the notes within the score in order to denote which notes should be played with which hand.

The invention may accomplish this by coloring the first drumstick white, coloring the second drumstick black, and making the corresponding first figure white, and the corresponding second figure black, so that notes on the score that bear a white figure will be played with the white drumstick, and notes on the score bearing a black figure will be played using the black drum stick. A generally circular shape is commonly chosen for the shape of each of the figures, but elliptical and polygonal shapes may work as well.

The method may also include the step of adding a second tom-tom to the drum set. In this form of the inventive method, a seventh color is assigned to the second tom tom, and notes on the score that should be played on the second tom-tom are likewise assigned the seventh color.

A third tom-tom may also supplement the drum set. In that case, an eighth color is assigned to the third tom tom, and notes that should be played on the third tom-tom are depicted on the score using the corresponding eighth color.

Analogously, a second crash cymbal may supplement the drum set. In that case, a ninth color is assigned to the second crash cymbal, and notes that should be played on the second crash cymbal are depicted on the score using the corresponding ninth color.

THE SYSTEM

Generally stated, the invention is a system for teaching a drummer how to play any multi-component percussion equipment. The system will include a musical score having at least one staff and a plurality of notes written onto the at least one staff, and first and second drum sticks. A plurality of respective indicators, each indicator having distinct color, is attached to each respective component of the equipment. Furthermore, the score is color-coded so that notes that are to be played on a respective component are indicated in a respective color.

The inventive system is well-suited to teach a student how to play a drummer's score on any multi-component percussion equipment, but may be specifically applied to teach students how to play tri, quad, and quint tom-tom sets that are well-known to be used by percussionists in marching bands, drum corps, and the like. The inventive system may also have specific application to teach a drummer how to play a basic drum set. Each application of the system is discussed separately below.

The System with Multi-Component Percussion Equipment, such as Quad Tom-Toms

In this application of the system, the equipment includes at least three adjacent percussion instruments. Additionally, the system will have an indicator bearing first color on the first percussion instrument, an indicator bearing a second color on the second percussion instrument, and an indicator bearing a third color on the third percussion instrument. Thus, notes on the score that are to be played on the first percussion instrument are depicted in the first color, and notes on the score that are to be played on the second percussion instrument are depicted in second color; and so forth.

A fourth percussion instrument may be positioned adjacent at least one of the first, second or third percussion instruments, and an indicator bearing a fourth color and may be positioned on the fourth percussion instrument. In like manner, notes on the score that are to be played on the fourth percussion instrument are depicted in the fourth color.

In one embodiment of the system, each of the percussion instruments is a drum. Of course, myriad combinations of instruments are possible.

The system may also include a first figure on each note in the score that is to be played with the first drum stick; and, a second figure may be imposed on each note in the score that is to be played with the second drum stick.

Preferably, the first figure is white and the second figure is black. Correspondingly, the first drumstick is white, and the second drumstick is black. Thus, each of the first and second figures is positioned within a body of each respective note in order to indicate which stick should be used to play the respective note. Generally, the first and second figures are circular, elliptical or polygonal.

The System with a Drum Set

As noted above, the inventive system may be used in conjunction with a traditional drum set. Generally, the drum set will include a snare drum, a bass drum, a tom-tom, a high hat, a crash cymbal, and a ride cymbal. The foregoing drum set components are color coded.

Specifically, the snare drum bears an indicator of a first color, the bass drum bears an indicator of a second color, the tom-tom bears an indicator of a third color, the high hat cymbal bears an indicator of a fourth color, the crash cymbal bears an indicator of a fifth color, and the ride cymbal bears an indicator of a sixth color.

The system will also include a color-coded drummer's score. Specifically, the drummer's musical score typically has at least one staff and a plurality of notes written onto the at least one staff. The score is coded so that notes to be played on each component of the drum set are written in the score in the corresponding respective color. The system will also include first and second drum sticks.

Optionally, the drum set may include a second tom-tom. In this embodiment, the second tom-tom bears an indicator of a seventh color, and notes to be played on the second tom-tom are depicted in the score using the seventh color.

Likewise, the drum set may also include a third tom-tom. In this embodiment, the third tom-tom bears an indicator of an eighth color, and notes to be played on the third tom-tom are depicted in the score using the eighth color.

The system may also include a second crash cymbal. The second crash cymbal, if present, will have an indicator of a ninth color. In like manner, notes to be played on the second crash cymbal appear on the score in the corresponding ninth color.

The system also may be used to teach use of distinct sticks. In a preferred embodiment, the first drum stick is white and the second drum stick is black. Usually, the drummer holds the white stick in her right hand and the black stick in her left. Thus, notes on the score that are to be played with the white drum stick (i.e., the stick in the right hand) bear a white figure, and notes on the score that should be played with the black drum stick (i.e., the stick in the left hand) bear a black figure.

Many alternatives exist for attaching the respective indicators of color on the components of the drum set. For example, one may color the drum head, or at least a portion thereof. Alternatively, the drum body may be colored, or a respectively colored decal may be affixed to either the drum body or the drum head. Painting or dying of a respective component is also possible.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
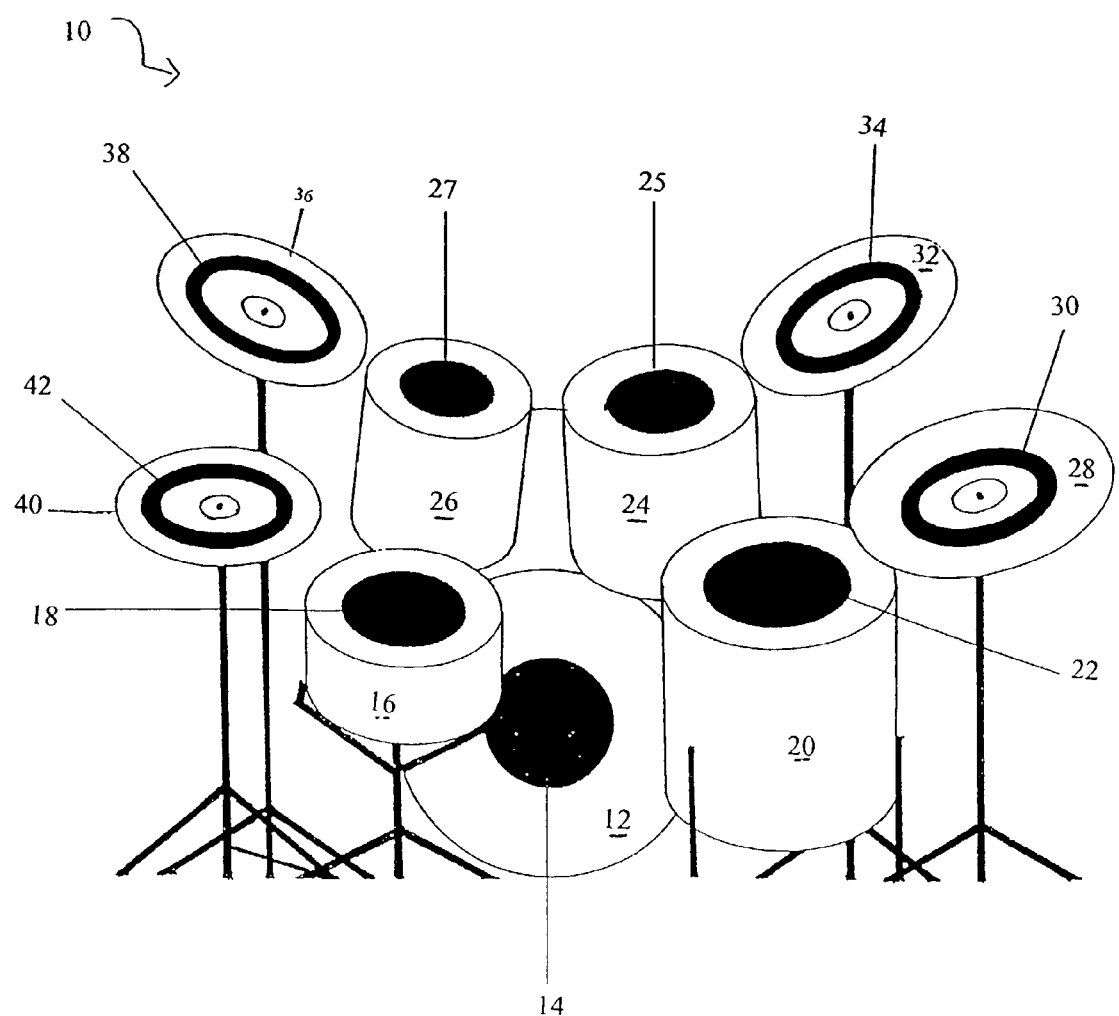
FIG. 1 is a perspective view of a drum set bearing respective colored indicators, according to the principles of the invention.

FIG. 1 shows the invention in conjunction with a drum set 10 having a bass drum 12, bearing an indicator 14, a snare drum 16 bearing an indicator 18, and tom-toms 20, 24 and 26 bearing indicators 22, 25 and 27, respectively.

The embodiment in FIG. 1 further includes a hi hat 40 bearing an indicator 42, as well as a ride cymbal 28 bearing a respectively colored indicator 30. Additionally, the drum set 10 includes a pair of crash cymbals 32,36 having respective indicators 34,38.

As shown in FIG. 1, the indicators are attached directly to each respective piece of equipment. Specifically, each drum bears an indicator on its head; this position increases the visibility to the drummer. Of course, the indicators may be positioned elsewhere, such as on the sides (ie., the body) of the drums. Alternatively, the entire drum head may bear the respective color. It is well-known that the application of a decal to a drum head or cymbal may cause unwanted dampening. Thus, in order to prevent unwanted damping, specially manufactured equipment bearing the respective colors are preferred.

Figure 2:
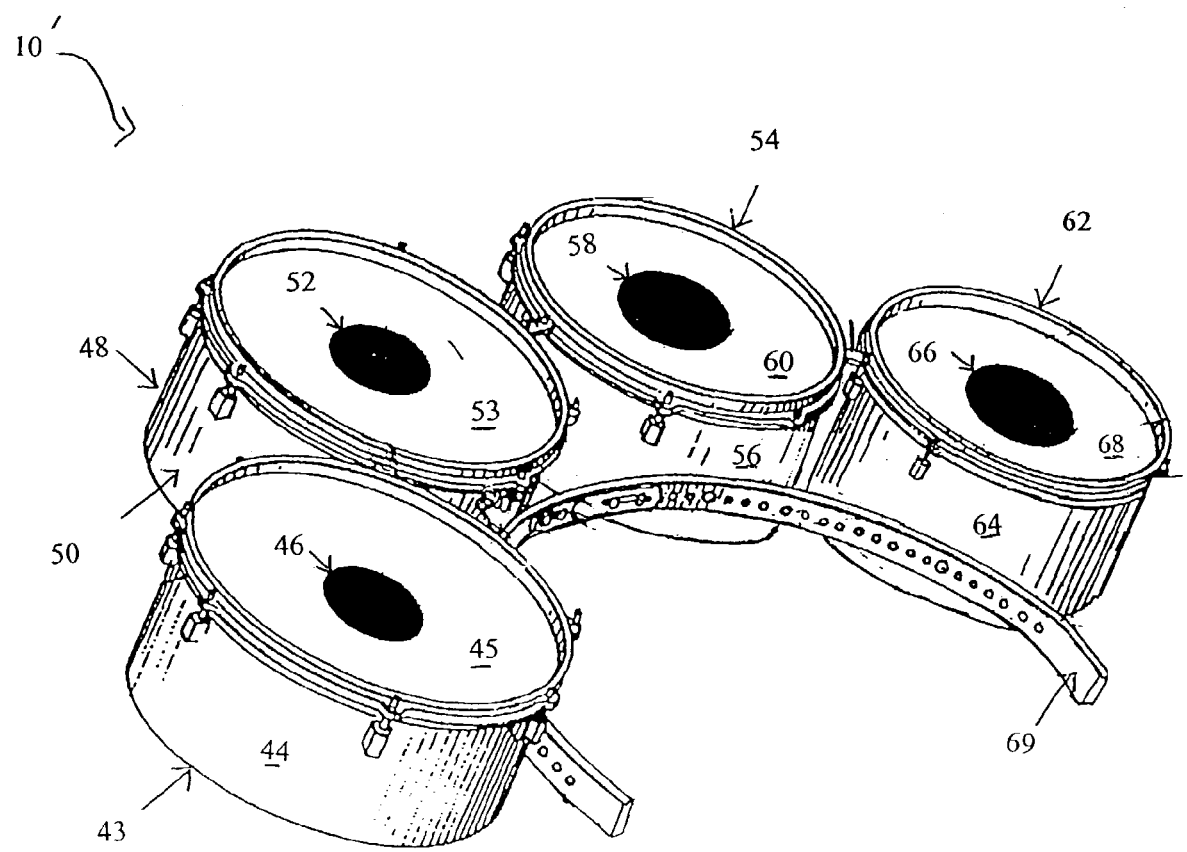
FIG. 2 is a perspective view of a set of quad tom-toms bearing respective colored indicators, according to the principles of the invention.

FIG. 2 shows a standard quad tom-tom set 10'. The quads 10' comprise four drums 43, 48,54, and 62 with respective indicators 46, 52,58, and 66 on respective drum heads 45,53,60 and 68. Alternatively, indicators may be placed on respective drum bodies 44,50,56 or 64. In yet another embodiment, the entire drum head 45,53,60,68 may be produced of a respective color. As shown, the drums 43,48, 54 and 62 are mounted to a bracket 69 that is generally worn by an ambulatory drummer.

Figure 3:
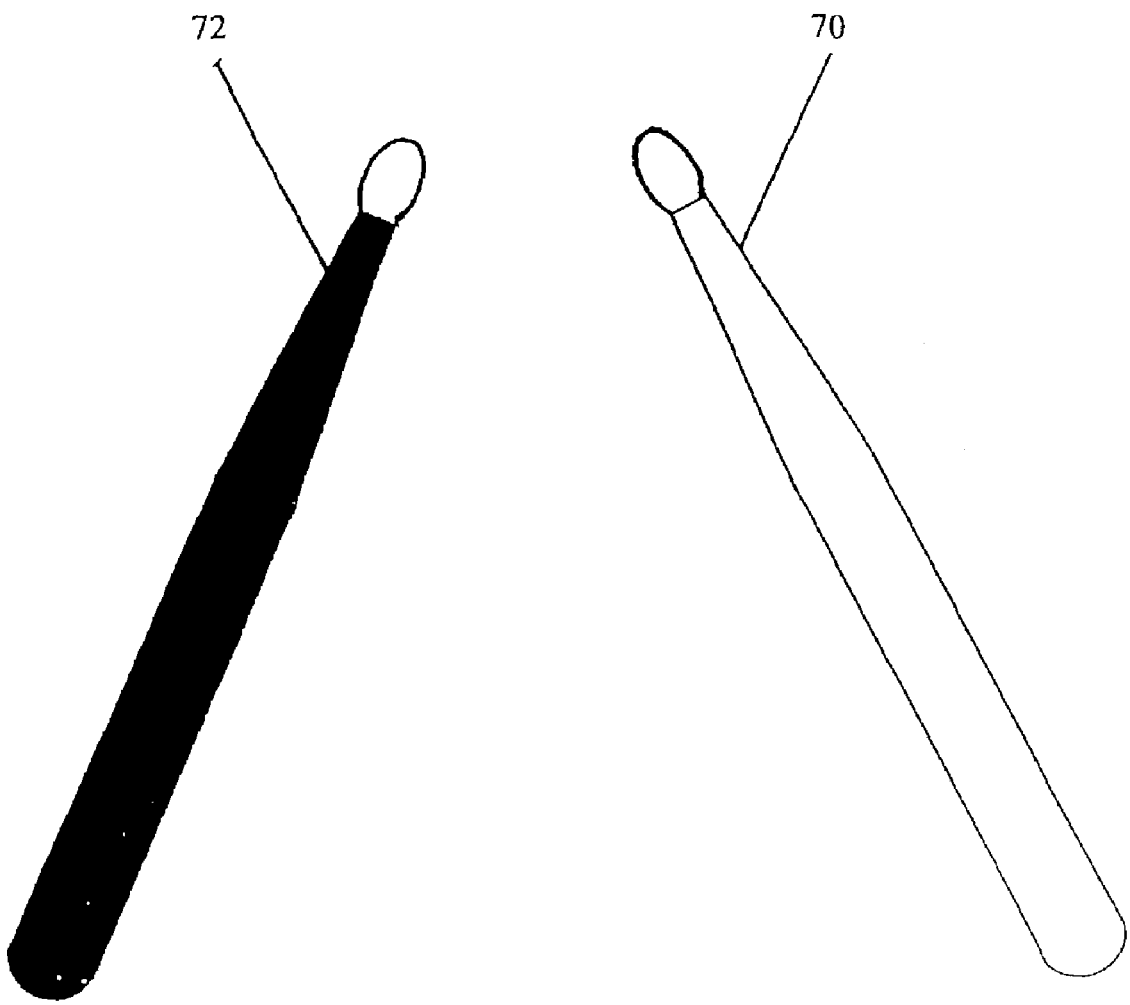
FIG. 3 shows a pair of drum sticks.

FIG. 3 shows a pair of drum sticks 70,72. Note that the first drum stick 70 is colored white, and the second drum stick 72 is colored black. A drummer will generally hold the first drum stick 70 in her right hand, and the second drum stick 72 in her left. The sticks are coded black/white in order to help the student differentiate which stick should be used to play notes on a musical score. A better understanding of this differentiation is facilitated by a discussion of the particulars of the musical score.

Figure 4:
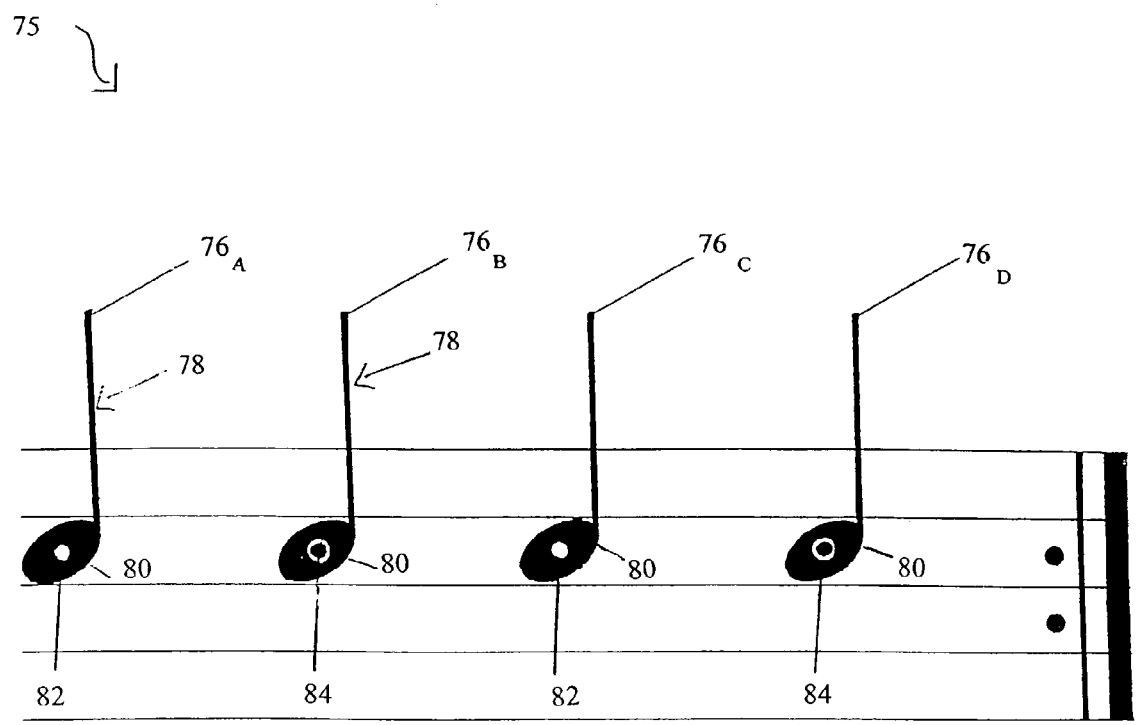
FIG. 4 shows a portion of a color-coded drummer's score.

FIG. 4 shows a single measure of a drummer's score 75 for a typical drum set. Generally, the notes designated to be played on the snare are written on the third space of the staff, alias C. Thus, FIG. 4 shows a four-beat measure comprising four simple quarter-note 76 strokes on the snare drum.

Still referring to FIG. 4, note that each quarter note 76 has a stem 78 and a body 80. Each of the notes 76 played by the snare drum—consequently, written an octave above middle-C on the staff 75—are written in a first color. When the staff 75 is played on a drum set 10 as shown in FIG. 1, the color of each quarter note 76 will match the colored indicator 18 of the snare drum 16 (compare, FIG. 1).

Still referring to FIG. 4, each quarter note 76 will bear either a first FIG. 82 or a second FIG. 84 on the quarter note 76. FIG. 4 admittedly shows the FIGS. 82, 84 embedded within the respective bodies 80 of the quarter notes 76, but they may be positioned elsewhere on the note, such as on the stem 78.

Still referring to FIG. 4, the first FIG. 82 is shown to be a white circle, and the second FIG. 84 is shown to be a black circle. When the staff 75 (of FIG. 4) is played by a drummer on the drumset 10 (as in FIG. 1), the drummer will beat note $76_A$ on the snare drum (ie., snare drum 16 in FIG. 1) with his right hand (i.e., white drumstick 70 shown in FIG. 3), then the drummer will beat note $76_B$ with his left hand (i.e., the black drumstick 72 shown in FIG. 3), and so forth. The score 75 set forth in FIG. 4 may also be played on a tri tom, or quad set 10' as set forth in FIG. 2.

Figure 5:
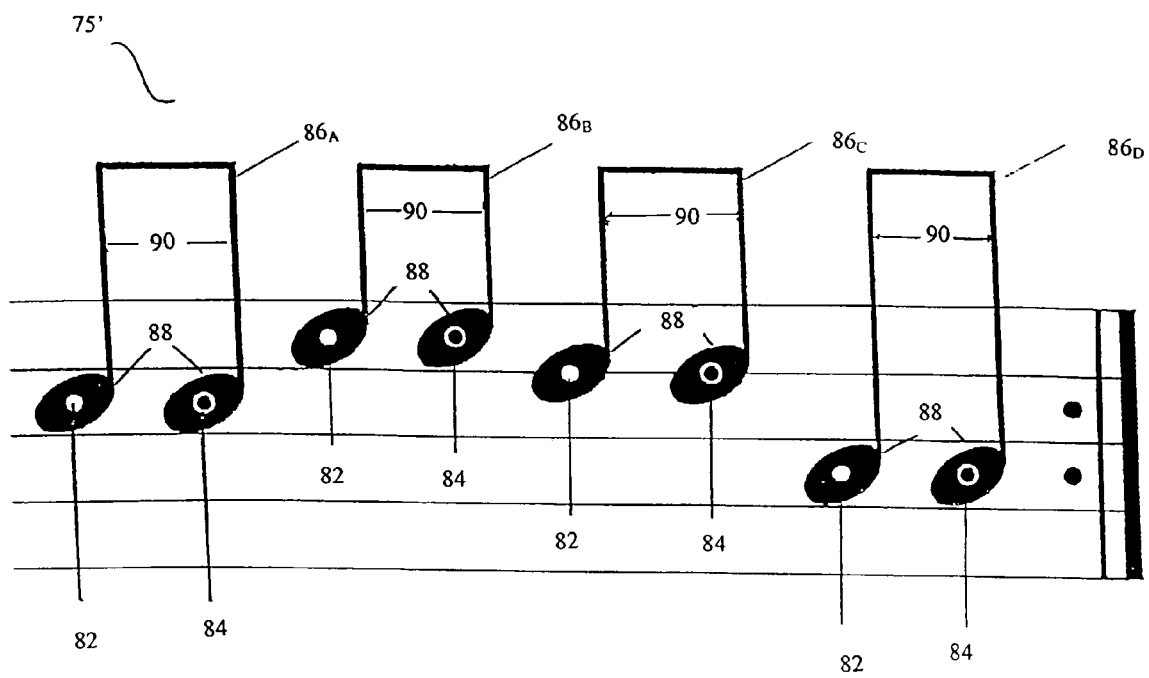
FIG. 5 shows a portion of a color-coded drummer's score.

FIG. 5 shows a staff 75' with four pairs of eighth notes 86. Each respective eighth note within staff 75' has a body 88 and a stem 90. A first FIG. 82 is depicted within the body 88 of each initial note of the pair of eighth notes 86, and a second FIG. 84 is depicted within the body 88 of each second note of the pair of eighth notes 86. The first FIG. 82, shown to be a white circle, indicates that the drummer should use the first stick (ref. no. 70 in FIG. 3) to play this note. Conversely, second FIG. 84, shown to be a black circle in the body 88 of each eighth note indicates that the drummer should use the second stick (ref. no. 72 in FIG. 3) to play this note.

Still referring to FIG. 5, the staff 75' is appropriate for either use with a standard drum set 10, as set forth in FIG. 1 or with a standard quad tom set, as shown in FIG. 2. Each of these will be addressed separately.

When the score 75' shown in FIG. 5 is played with a standard drum set 10 (see FIG. 1), each of the drum parts of the score 75' is written on a respective position within the score 75'. As aforementioned, the C above middle C (i.e., the third space within the score 75') will be played on the snare drum 16 of the drum set 10 (shown in FIG. 1).

Considering both FIGS. 1 and 5 together, the initial pair of eighth notes $86_A$ (as in FIG. 5) of the score 75' will be played on the snare drum 16 (of FIG. 1). The next pair of eighth notes $86_B$ (of FIG. 5) will be played on tom tom 26 (of FIG. 1). The third pair of eighth notes $86_C$ (of FIG. 5) will be played on tom tom 24 (of FIG. 1). The fourth pair of eighth notes $86_D$ will be played on tom tom 20 (of FIG. 1).

As aforementioned, each of the drums 16,26,24,20 will bear respective colored indicator 18,27, 25, 22. Each colored indicator will correspond to the color of notes from the score 75' that are to be played on the respective drum. Also, each eighth note $86_{A-D}$ bears a figure that indicates to the drummer which stick should be used to beat the note. Of course, the inventive system and method may also be used to teach a drummer how to play tri, quad, or quint tom tom sets. A typical quad tom tom set is shown in FIG. 2.

Viewing FIG. 4 in and FIG. 2 together, when the system and method are used to teach one how to use a quad set, each separate tom drum 43, 48,54, 62 will be noted on the staff 75' (FIG. 4) using a different line or space of the staff. For example, drum 43 may be assigned the C space in the middle of the staff, as the notes $86_A$ appear. Moreover, notes to be played on the second drum 48 (of FIG. 2) may be noted as an E on the score 75', as shown to be $86_B$, and so forth.

Regardless of which piece of equipment (i.e. drum set, as in FIG. 1 or Quads as in FIG. 2) is being used, the system and method may also be used to teach the drummer which hand (i.e., which stick) should be used to strike each respective note. In that regard, a FIG. 82,84 is imposed within the body 88 of each eighth note $86_{A-D}$. Typically, the first and second FIGS. 82,84 are white or black circles, but other shapes may be used.

Viewing FIG. 5 in conjunction with FIG. 3, each note $86_{A-D}$ bearing a first FIG. 82 (i.e., a white figure) will be played with first stick 70 (i.e., a white stick). Conversely, each note $86_{A-D}$ bearing second FIG. 84 (i.e., a black figure) will be played with second stick 72 (i.e., a black stick). Thus, the system teaches not only which component to strike, the system also teaches which hand a drummer should use to strike a component.

Figure 6:
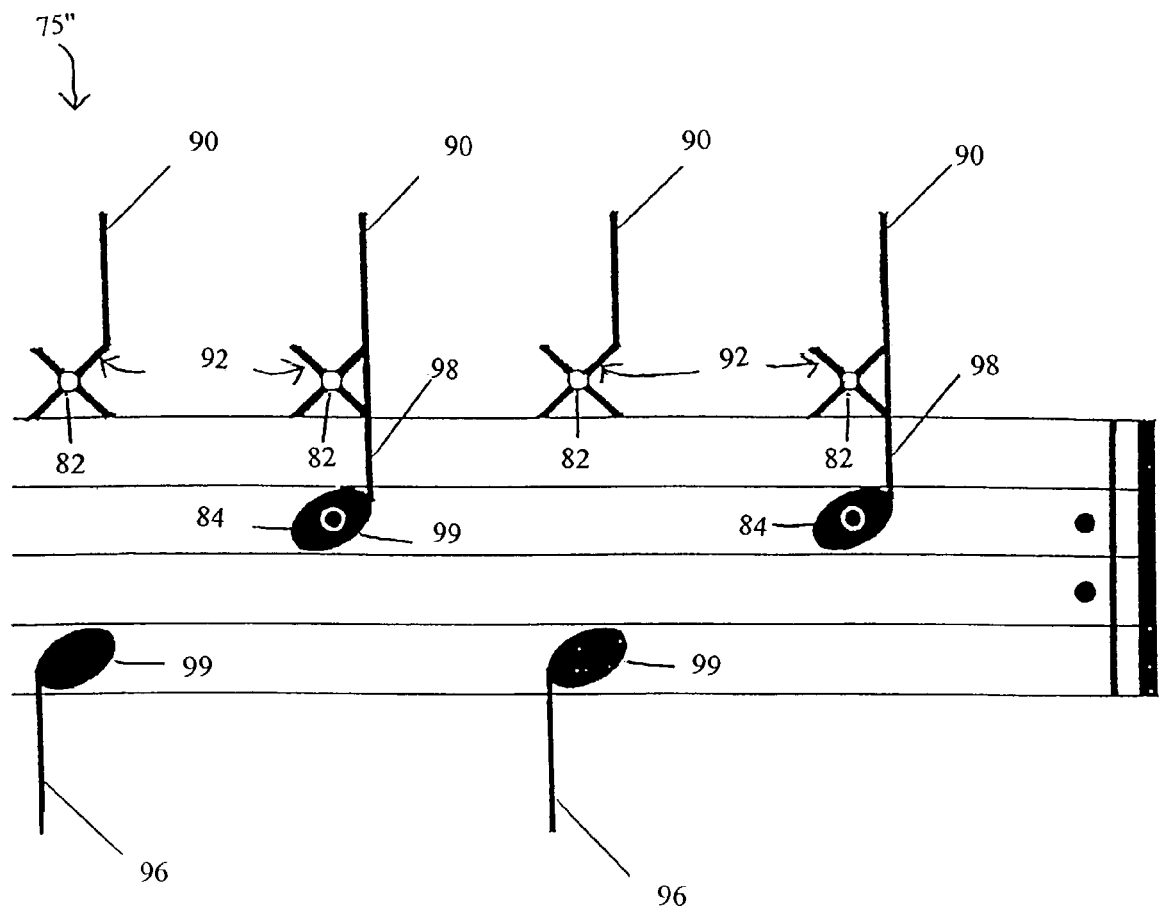
FIG. 6 shows a portion of a color-coded drummer's score.

FIG. 6 shows a portion of a score 75" to be played by a drummer using a drum set 10 such as the one shown in FIG. 1. The score 75" includes notes 90 (of FIG. 6) that are to be played by the hi hat 40 (of FIG. 1), notes 96 (FIG. 6) that are to be played on the bass drum 12 (FIG. 1), and notes 98 (FIG. 6) to be played on the snare 16 (FIG. 1). Generally, notes to be played on a drum are noted with a solid body 99, and notes indicating a cymbal strike are indicated as an X 92.

As shown in FIG. 6, each body—whether it be a solid body 99 or an X-type body 92 bears a FIG. 82,84 to indicate which stick should be used. Note that the body 92 of the hi hat note 90 bears a white circle 82, and the body 99 of the snare drum note 98 bears a black circle 84. This assists the drummer by showing which stick—the white stick 70 or the black stick 72—should be used to play the respective note.

It is well-known that other implements, such as brushes or mallets, are often used to strike percussion instruments. The invention may be conformed to color-code not only drumsticks, but myriad other implements as well.

Viewing FIGS. 6 and 1 together, each note 90 (hi hat note), 96 (bass drum note), 98 (snare drum note) on the score 75" (shown in FIG. 6) is assigned a color that corresponds to a colored indicator 42 (hi hat colored indicator), 14 (bass drum colored indicator), 18 (snare drum colored indicator) on its respective component 40 (hat in FIG. 1), 12 (bass in FIG. 1), or 16 (snare in FIG. 1).

Note that the bass drum notes 96 bear a solid body 99; no FIGS. 82,84 are shown imprinted thereon. This is merely because the drum set 10 of FIG. 1 is a single-bass drum set, and therefore only one foot pedal is generally required. However, the system may be expanded to a double-bass drum set, which would require the drummer to use both feet. In that event, the notes on the score 75" and the respective foot pedals (not shown) could be similarly color-coded in order to teach the drummer which notes could be played with each foot.

Generally, each component of multi-component percussion equipment is given its own corresponding color—both on the component itself, and on the drummer's score. Additional types of coding is also within the spirit of this invention. For example, shading may indicate volume of each note. Specifically, if one selects green as the color assigned to the snare drum, a a soft, gentle tap on the snare may be noted as a pale shade of green on the score. Conversely, a loud crash on the snare could be noted on the score with a deeper, darker shade of green.

Although the present invention has been described and illustrated in detail, the herein above descriptions set forth are to be clearly understood that the same is by way of illustration and example only, and is not to be taken by way of limitation. The spirit and scope of the present invention are to be limited only by the terms of the appended claims.

I claim:

1. A method of teaching a student how to play a drummer's score on multi-component percussion equipment, the method comprising the steps of:
    attaching respective indicators, each bearing a distinct color, to each respective component of the percussion equipment;
    coloring notes on the drummer's score with respective matching colors;
    playing notes on the drummer's score in a respective color on the respective component bearing the matching color.

2. The method of claim 1, wherein the attaching step comprises at least one of the following steps:
    affixing a respectively colored decal to at least a portion of the respective component; or
    coloring at least a portion of the respective component with its respective color.

3. The method of claim 1, wherein the equipment includes at least three adjacent percussion instruments, and the method further comprises the steps of:
    attaching an indicator of a first color to the first percussion instrument;
    attaching an indicator of a second color to the second percussion instrument;
    attaching an indicator of a third color to the third percussion instrument;
    coloring notes on the score that are to be played on the first percussion instrument with the first color;
    coloring notes on the score that are to be played on the second percussion instrument with the second color; and,
    coloring notes on the score that are to be played on third percussion instrument with the third color.

4. The method of claim 3, further comprising the steps of:
    positioning a fourth percussion instrument adjacent at least one of the first, second or third percussion instrument;
    attaching an indicator of a fourth color to the fourth percussion instrument; and,
    coloring notes on the score that are to be played on the fourth percussion instrument with the fourth color.

5. The method of claim 3, wherein each of the percussion instruments is a drum.

6. The method of claim 1, further comprising the steps of assigning a first drum stick to the student's right hand;
    assigning a second drum stick to the student's left hand;
    imposing a first figure on each note in the score to be played with the student's right hand; and,
    imposing a second figure on each note in the score to be played with the student's left hand.

7. The method of claim 6, further comprising the steps of coloring the first drumstick white;
    coloring the first figure white;
    coloring the second drumstick black; and,
    coloring the second figure black.

8. The method of claim 1, wherein the equipment is a drum set having a bass drum, a snare drum, a tom-tom, a high hat cymbal, a crash cymbal, a ride cymbal, the method further including the steps of:
    attaching an indicator of a first color to the snare drum;
    attaching an indicator of a second color to the bass drum;
    attaching an indicator of a third color to the tom tom;
    attaching an indicator of a fourth color to the high hat cymbal;
    attaching an indicator of a fifth color to the crash cymbal;
    attaching an indicator of an sixth color to the ride cymbal;
    coloring notes on the score that are to be played on the snare drum with the first color;
    coloring notes on the score that are to be played on the bass drum with the second color;
    coloring notes on the score that are to be played on the tom-tom with the third color;
    coloring notes on the score that are to be played on the high hat cymbal with the fourth color;
    coloring notes on the score that are to be played on the crash cymbal with the fifth color; and,
    coloring notes on the score that are to be played on the ride cymbal with the sixth color.

9. The method of claim 8, further comprising the steps of adding a second tom-tom to the drum set;
    attaching an indicator of a seventh color to the second tom tom; and,
    coloring notes on the score that should be played on the second tom-tom with the seventh color.

10. The method of claim 9, further comprising the steps of
    adding a third tom-tom to the drum set;
    attaching an indicator of an eighth color to the third tom tom; and,
    coloring notes on the score that should be played on the third tom-tom with the eighth color.

11. The method of claim 8, further comprising the step of adding a second crash cymbal to the drum set;
    attaching an indicator of a ninth color to the second crash cymbal; and,
    coloring notes on the score that should be played on the second crash cymbal with the ninth color.

12. A system for teaching a drummer how to play multi-component percussion equipment, the system including
    a musical score having at least one staff and a plurality of notes written onto the at least one staff;
    a first drum stick;
    a second drum stick;
    a plurality of respective indicators, each indicator having distinct color, attached to each respective component of the equipment; wherein,
    the score is color-coded such that notes that are to be played on a respective component are indicated in a respective color.

13. The system of claim 12, wherein the equipment includes at least three adjacent percussion instruments, the system further comprising:
   an indicator bearing first color on the first percussion instrument;
   an indicator bearing a second color on the second percussion instrument;
   an indicator bearing a third color on the third percussion instrument; and wherein
   notes on the score that are to be played on the first percussion instrument are depicted in the first color;
   notes on the score that are to be played on the second percussion instrument are depicted in second color; and,
   notes on the score that are to be played on third percussion instrument with the third color.

14. The system of claim 13, further including
   a fourth percussion instrument positioned adjacent at least one of the first, second or third percussion instruments;
   an indicator bearing a fourth color and positioned on fourth percussion instrument, wherein,
   notes on the score that are to be played on the fourth percussion instrument are depicted in the fourth color.

15. The system of claim 14, further including
   a first figure on each note in the score that is to be played with the first drum stick; and,
   a second figure on each note in the score that is to be played with the second drum stick.

16. The system of claim 15, wherein
   the first figure is white;
   the first drumstick is white;
   the second figure is black; and,
   the second drumstick is black.

17. The system as in claim 12, the equipment comprising a drum set including
   a snare drum bearing an indicator of a first color;
   a bass drum bearing an indicator of a second color;
   a tom-tom bearing an indicator of a third color;
   a high hat cymbal bearing an indicator of a fourth color;
   a crash cymbal bearing an indicator of a fifth color;
   a ride cymbal bearing an indicator of a sixth color;
   wherein,
   notes to be played on the snare drum appear on the score in the first color;
   notes to be played on the bass drum appear on the score in the second color;
   notes to be played on the tom-tom appear on the score in the third color;
   notes to be played on the high hat cymbal appear on the score in the fourth color;
   notes to be played on the crash cymbal appear on the score in the fifth color; and
   notes to be played on the ride cymbal appear on the score in the sixth color.

18. The system as in claim 17, further comprising
   a second tom-tom bearing an indicator of a seventh color, wherein notes to be played on the second tom tom appear on the score in the seventh color.

19. The system as in claim 18, further comprising
   a third tom-tom bearing an indicator of an eighth color, wherein notes to be played on the second tom tom appear on the score in the eighth color.

20. The system as in claim 12, further comprising
   a second crash cymbal bearing an indicator of a ninth color wherein, notes to be played on the second crash cymbal appear on the score in the ninth color.

21. The system as in claim 12, wherein
   the first drum stick bears a first shade, and
   the second drum stick bears a second shade; and wherein,
   notes within the score that are to be played using the first drum stick bear a figure having the first shade; and,
   notes within the score that are to be played using the second drum stick bear a figure having the second shade.

22. A system for teaching a drummer how to play a drum set, the system including
   a drummer's musical score having at least one staff and a plurality of notes written onto the at least one staff;
   a white drum stick;
   a black drum stick;
   the drum set including
      a snare drum bearing an indicator of a first color;
      a bass drum bearing an indicator of a second color;
      a tom-tom bearing an indicator of a third color;
      a high hat cymbal bearing an indicator of a fourth color;
      a crash cymbal bearing an indicator of a fifth color;
      a ride cymbal bearing an indicator of a sixth color;
      a second tom-tom bearing an indicator of a seventh color;
      a third tom-tom bearing an indicator of an eighth color; and
      a second crash cymbal bearing an indicator of a ninth color;
   each respective indicator being one of
      at least a portion of a drum head;
      a drum body;
      a respectively colored decal; or
      a respectively colored painted section;
   wherein,
      notes to be played on the snare drum appear on the score in the first color;
      notes to be played on the bass drum appear on the score in the second color;
      notes to be played on the tom-tom appear on the score in the third color;
      notes to be played on the high hat cymbal appear on the score in the fourth color;
      notes to be played on the crash cymbal appear on the score in the fifth color;
      notes to be played on the ride cymbal appear on the score in the sixth color;
      notes to be played on the second tom-tom appear on the score in the seventh color;
      notes to be played on the third tom-tom appear on the score in the eighth color; and
      notes to be played on the second crash cymbal appear on the score in the ninth color;
   and wherein,
      notes to be played with the white drum stick have a white circle thereon; and
      notes to be played with the black drum stick have a black circle thereon.

* * * * *